(12) United States Patent
D'Angelo et al.

(10) Patent No.: US 9,135,603 B2
(45) Date of Patent: Sep. 15, 2015

(54) METHODS AND SYSTEMS FOR MERGING TOPICS ASSIGNED TO CONTENT ITEMS IN AN ONLINE APPLICATION

(75) Inventors: Adam D'Angelo, Palo Alto, CA (US); Charles Duplain Cheever, Palo Alto, CA (US); Kevin G. Der, Palo Alto, CA (US)

(73) Assignee: Quora, Inc., Mountain View, CA (US)

( * ) Notice: Subject to any disclaimer, the term of this patent is extended or adjusted under 35 U.S.C. 154(b) by 899 days.

(21) Appl. No.: 12/795,482

(22) Filed: Jun. 7, 2010

(65) Prior Publication Data

US 2011/0302216 A1    Dec. 8, 2011

(51) Int. Cl.
*G06F 17/30* (2006.01)
*G06Q 10/10* (2012.01)
*G06Q 10/00* (2012.01)

(52) U.S. Cl.
CPC .................................. *G06Q 10/101* (2013.01)

(58) Field of Classification Search
CPC combination set(s) only.
See application file for complete search history.

(56) References Cited

U.S. PATENT DOCUMENTS

| | | | |
|---|---|---|---|
| 5,530,852 A * | 6/1996 | Meske et al. | 709/206 |
| 6,064,978 A * | 5/2000 | Gardner et al. | 705/7.32 |
| 6,185,557 B1 * | 2/2001 | Liu | 707/999.002 |
| 6,912,549 B2 * | 6/2005 | Rotter et al. | 707/999.002 |
| 7,165,214 B2 * | 1/2007 | Ishizaka | 715/213 |
| 7,283,994 B2 * | 10/2007 | Heusermann | 707/695 |
| 7,418,437 B1 * | 8/2008 | Marks | 707/999.001 |
| 7,512,625 B2 * | 3/2009 | Lariba-Pey et al. | 707/999.001 |
| 7,647,344 B2 * | 1/2010 | Skurtovich et al. | 707/999.107 |
| 7,966,291 B1 * | 6/2011 | Petrovic et al. | 707/641 |
| 8,095,975 B2 * | 1/2012 | Boss et al. | 726/17 |
| 8,359,285 B1 * | 1/2013 | Dicker et al. | 706/45 |
| 2003/0182450 A1 * | 9/2003 | Ong et al. | 709/246 |
| 2006/0184566 A1 * | 8/2006 | Lo et al. | 707/102 |
| 2007/0260564 A1 * | 11/2007 | Peters et al. | 706/14 |
| 2010/0076998 A1 * | 3/2010 | Podgorny et al. | 707/772 |
| 2011/0150198 A1 * | 6/2011 | Walsh et al. | 379/202.01 |
| 2012/0016837 A1 * | 1/2012 | Matsuda et al. | 707/609 |

* cited by examiner

*Primary Examiner* — Yicun Wu
(74) *Attorney, Agent, or Firm* — Schwegman Lundberg & Woessner, P.A.

(57) ABSTRACT

A question-and-answer application having questions with which topics are associated is described. In some embodiments, user-generated topics are assigned to questions to indicate the subject matter covered by the questions. The application logic includes topic merge logic for quickly and efficiently merging two topics, while enabling the topic merge operation to be easily undone if necessary.

18 Claims, 10 Drawing Sheets

| | | | | | 74 |

76
[                              ] ADD QUESTION or SEARCH 80
( AMUSEMENT PARKS x ) ( DISNEYLAND x ) ( FAMILY VACATIONS x ) ( VACATION x )   ADD 82
                                                                              TOPIC

78
WHAT ARE THE MOST POPULAR RIDES AT DISNEYLAND?

84
ADD QUESTION DETAILS

ADD COMMENT   ADD FOLLOW-UP QUESTION   FLAG QUESTION

---

3 ANSWERS

92
△ JOHN SMITH, FOLLOWED BY 112 PEOPLE
▽ 1 vote by Greg Johnson

Just got back from Disneyland. The longest lines were, and almost always are, for Space Mountain, then 86
Matterhorn, Splash Mountain, Indiana Jones, and Big Thunder Railroad. However, line length probably
isn't the only thing to evaluate when assessing popularity.

ADD COMMENT   THANK   NOT HELPFUL

△ KATE JOHANSEN
▽ 1 vote by Steve Klein
                                                                                    88
Pirates of the Caribbean, Disneyland has some surprise mini-rollercoaster-like dips that POTC, DW
doesn't have. Star Tours is also fun, if that's still around

ADD COMMENT   THANK   NOT HELPFUL

△ ELLIOTT ADAMS, FOLLOWED BY 10 PEOPLE
▽
I would say that the Matterhorn is a popular one, especially because it's only in Disneyland and not Disney
World.
Space Mountain is another great standard that always has a decent queue

ADD COMMENT   THANK   NOT HELPFUL

Add Answer as USER 1 (make anonymous) 98

[ B | I | U | " | ≡ | ≔ ]

[                                                                             ] 94

[ SUBMIT ANSWER ] 96

FIGURE 4

100 QUESTION TOPIC TABLE

| QUESTION_ID | TOPIC_ID | TIME |
|---|---|---|
| Q1 | A | 1/1/2010 9:05 |
| Q1 | B | 1/6/2010 7:57 |
| Q1 | C | 9/6/2009 11:49 |
| Q1 | D | 3/19/2010 3:56 |
| ... | ... | ... |

102 TOPIC TABLE

| TOPIC_ID | TIME | NAME | MERGED_INTO_TOPIC_ID |
|---|---|---|---|
| A | 1/1/2010 8:37 | San Francisco Bay Area | |
| B | 1/5/2010 13:09 | The Bay Area | A |
| C | 9/6/2009 11:47 | San Francisco, CA | X |
| D | 3/19/2010 3:56 | San Francisco | |
| X | 6/6/2009 17:45 | The Greater Bay Area | |
| ... | ... | ... | ... |

METHODS AND SYSTEMS FOR MERGING TOPICS ASSIGNED TO CONTENT ITEMS IN AN ONLINE APPLICATION

TECHNICAL FIELD

The present disclosure generally relates to data processing techniques. More specifically, the present disclosure relates to methods and systems for quickly and efficiently performing a topic merge operation to merge into a common topic two or more content items (e.g., questions) that are assigned to different topics.

BACKGROUND

A variety of web-based applications provide users with the ability to collaboratively generate content, for example, by creating and/or editing web page components, or even entire web pages, via a conventional web browser application. Some web-based applications that provide such functionality are referred to as wikis. One particular type of application that provides such functionality is a web-based encyclopedia that allows users to generate and edit articles on various topics of interest. Another example of an application that relies on collaborative, user-generated content is a question-and-answer application that provides an online forum that enables users to post questions, post answers to questions, or simply view questions and corresponding answers.

With this type of application, because the content is user-generated and often several users may be contributing, it is often difficult to effectively and efficiently maintain the content in an organized manner. For instance, with a web-based encyclopedia application, multiple users may generate articles for similar, or even the same, topic. As the number of article entries grows, it can become an extremely daunting and time consuming task for a content administrator to manually identify what are essentially duplicate articles and then combine their content. Similarly, with a question-and-answer application, users may establish various topics or categories to which questions are assigned. When users create multiple topics for what is essentially the same subject matter, it may become difficult for users to quickly identify content of interest. For instance, if four or five synonymous topic names exist for the same subject matter, such as, "San Francisco Bay Area," "The Bay Area," "San Francisco, Calif.," "San Francisco," "The Greater Bay Area," and so forth, it becomes difficult for a user to know which of the several topics to select to find relevant information. When different topic names are used for the same subject matter, it may be time consuming for a user to assign a particular question to all of the relevant topics. Moreover, as the number of topics associated with a particular questions increases, the time required to process the data and to identify and recall all of the topics associated with a particular question may also increase, thereby introducing a delay into the user experience.

DESCRIPTION OF THE DRAWINGS

Some embodiments of the invention are illustrated by way of example, and not limitation, in the figures of the accompanying drawings, in which.

DETAILED DESCRIPTION

Methods and systems for efficiently performing an operation to merge two different topics are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Although a skilled artisan will readily appreciate the applicability of the described invention in a wide variety of applications and contexts, the inventive subject matter described herein is presented in the context of an online question-and-answer application. A question-and-answer application provides an online forum where users can post questions, post answers to questions, or simply search for and review questions and answers that others have posted. As such, a question-and-answer application is an information repository of user-generated content that is organized and presented in a relatively simple and intuitive manner. Consistent with some embodiments of the invention, to further aid in the overall organization and presentation of information, a question can be associated with one or more topics representing, for example, a subject matter to which the question relates. Take for example the question, "What is the population of San Francisco?" This question may be assigned to the topic, "San Francisco." As users post questions for others to answer, users can designate each question as being related to one or more existing topics, or users can create and designate new topics.

As the amount of information relevant to a given subject matter grows, users may find it desirable to merge one topic with another topic. For instance, if separate topics exist for "San Francisco" and "San Francisco, Calif.," it may be desirable to merge the two different topics into a single topic. Such an operation is described herein and is generally referred to as a topic merge operation. Consistent with an embodiment of the invention, a topic merge operation is a directional operation such that one topic is said to be "merged into" another topic. For instance, the topic, "San Francisco," might be merged into the topic, "San Francisco, Calif." In such a scenario, subsequent to the processing of the topic merge operation, any question previously associated with "San Francisco" will be associated with the topic, "San Francisco, Calif." However, because a topic merge operation is a directional operation, in this example a question that is associated with "San Francisco, Calif." will not, as a result of the topic merge operation, automatically be associated with the topic, "San Francisco." For purposes of the present disclosure, to distinguish between the topic that is being merged, and the topic into which another topic is merged, the term "target topic" is used. For instance, if topic A is being merged into topic B, then topic B is referred to herein as the target topic.

Consistent with some embodiments of the invention, the data structure or data representation of a topic, and the topic merge logic used to perform a topic merge operation, are designed to operate efficiently. For purposes of the present invention, this means that topics can be easily and quickly merged and unmerged, and recalling the topics associated with any particular content item (e.g., a question) is achieved rapidly with minimal processing. As will be described in greater detail below, the topic merge logic ensures that no topic is merged with another topic, if the other topic is itself merged with a third topic. For instance, if a user desires to merge a first topic (topic A) into a second topic (topic B), but the second topic is merged with a third topic (topic C), the topic merge logic prevents the requested merge operation, but instead will automatically merge the first topic with the third topic. In this example, the result of the topic merge operation will be that topic A is automatically merged into topic C. By preventing a topic from being merged into another topic that is itself merged into a third topic, the need to process lengthy linked lists, or perform several database table look-up operations, is eliminated. Instead, the depth of any linked data structure used for storing merged topics is at most one level or link deep. This ensures that the processing time required to identify all topics that have been assigned to or associated with a particular question, or to identify all topics that a particular use is following, is predictably short.

In addition, the topic merge logic is designed to enable a user or administrator to quickly and easily undo a topic merge operation (e.g., unmerge two previously merged topics). This is particularly important in the context of applications that are utilizing user-generated content and enabling users to merge topics. As is the case with many applications relying on user-generated content, there is a significant likelihood that there will be differences in opinion amongst users as to the subject matter covered by a particular topic or category. Accordingly, because any user has the ability to merge two topics, it is very advantageous to have a simple and easy mechanism for undoing a topic merge operation that is ultimately perceived to be undesirable or incorrect. Consistent with an embodiment of the invention, when a topic merge operation is performed, the operation is logged so that it can easily be undone. As will be described in greater detail below, because a topic merge is achieved without creating long linked lists of topics, undoing a single merge operation is as simple as writing to a single field of a database or updating a single data structure member. Other aspects of various embodiments of the invention are described below in connection with the description of the figures.

Figure 1:
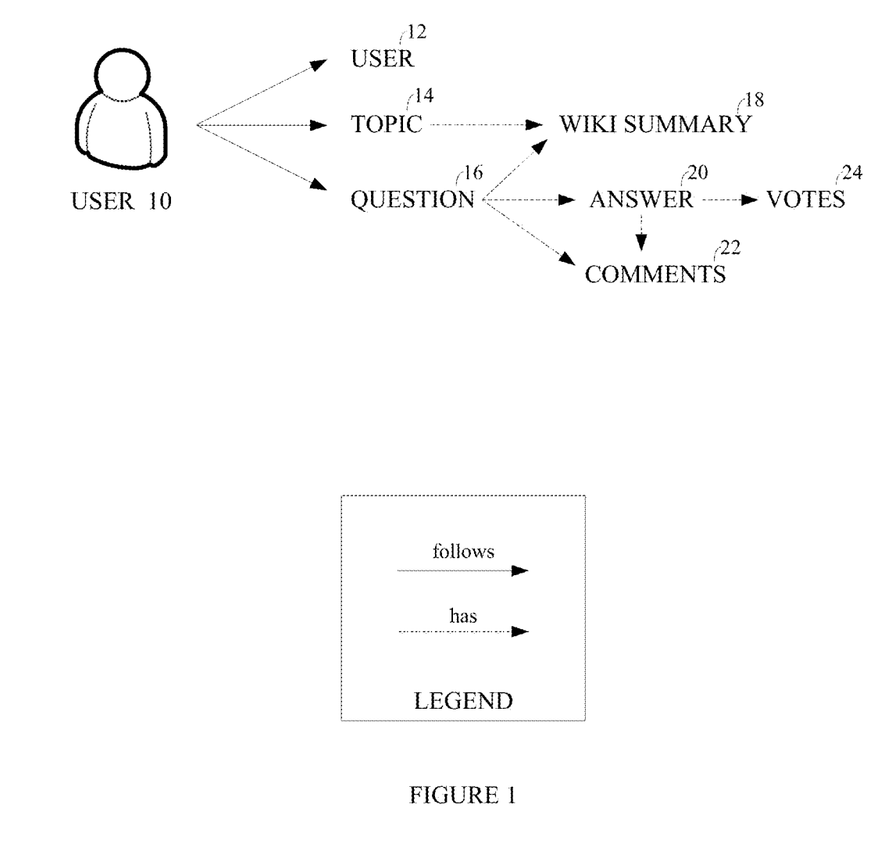
FIG. 1 is a simple relationship diagram illustrating how some of the various elements and participants of a question-and-answer application are related to one another in a particular embodiment of the invention.

FIG. 1 is a simple relationship diagram illustrating how some of the various elements and participants of a question-and-answer application are related to one another in a particular embodiment of the invention. For instance, as illustrated in FIG. 1, a user 10 of the question-and-answer application may follow another user 12, a topic 14, or a question 16. As used herein, the concept of "following" is somewhat analogous to the concept of subscribing in a subscription-based model. In contrast to the concept of two users being "connected" (e.g., in a social networking context), which typically implies a personal relationship between the users, when a user follows another user, there is no implied personal relationship between the two users. For instance, a first user may follow a second user simply because the first user believes the second user is particularly insightful with respect to a particular topic of interest. By "following" another user, a user can be automatically informed of activities of the other user. If, for example, user A is following user B, when user B posts a question or an answer to a question, user A will be notified of user B's posting activity. Similarly, if a user elects to follow a particular topic, as new questions are assigned to the particular topic, the user can be automatically notified of these new questions. In yet another example, if a user follows a particular question, as new answers are posted to the particular question, the user will be notified of the new answers.

In some embodiments of the invention, notifications may be communicated to a user by simply including the relevant content in a landing page or data feed displayed to the user. For example, when a user first provides his or her authentication information (e.g., username/password), the user may be presented with a personalized home page or landing page with content that is customized for the user. This content may be selected to include information regarding the users, topics and questions that the particular user is following. Additionally, in some embodiments, notifications may be communicated in near real-time to a user via any number of conventional and well-known messaging mechanisms, to include email, SMS or text messages, instant messages, and others. In some embodiments, a user may elect to be notified of certain activities or events on a per-question, per-topic or per-user basis. For instance, a user may elect to receive an email notification anytime a new answer is posted to a particular question that the user has posted, and is thus following by default.

Referring again to FIG. 1, a topic 14 may have a wiki summary 18 that provides a summary or some additional description of what subject matter is encompassed by the particular topic. Similarly, a question 16 may have a wiki summary 18 that provides some description or additional context for the question. In some embodiments, the wiki summary 18 for topics and questions may be user-editable by all users, while in other embodiments, only certain users will have the authority to edit a wiki summary. For instance, in some embodiments, only the person who posted a particular question may be authorized to edit the wiki summary for that particular question. In some embodiments, users may be assigned roles that determine various content or access privileges the users have with respect to different topics or questions. For instance, certain users may be assigned an "editor" role for a particular topic, thereby providing those users with editing privileges that are different from those of a regular user.

In addition to a wiki summary 18, a question 16 is associated with one or more answers 20. For instance, after a user posts a question, other users of the application are able to provide answers to the question. In some embodiments of the invention, any user is allowed to post an answer to a particular question. As such, a question may be associated with or have multiple answers. In some embodiments, both questions 16 and answers 20 may have comments. For instance, a user may provide a textual comment that is associated with a question 16 or an answer 20. A comment associated with an answer, for example, could provide some clarification about a particular answer, or some aspect of the answer. Other users can then view the comments when viewing the question and/or answers.

In some embodiments of the invention, an answer 20 has or is associated with votes 24. For example, users can vote up or vote down a particular answer based on whether the user finds the answer helpful in view of the particular question. For instance, if a user believes that a particular answer to a question is a good answer, the user can select a button or other graphical user interface element to vote for the answer. Similarly, if a user believes that a particular answer is not helpful in light of the question, the user can vote down the answer, for example, by simply selecting a button or other graphical user interface element to indicate that the answer is not helpful. In some embodiments, the number of votes for and against an answer are used as inputs to an algorithm that determines how answers are to be displayed when presented to a user. For example, the votes for and against an answer may simply be tallied, such that a vote for the answer offsets a vote against the answer, and the answers with the highest vote tallies are displayed in the most prominent positions—typically, at the top of a list of relevant answers.

By providing a forum that includes questions, answers, comments and votes, the question-and-answer application encourages meaningful discussion about a whole host of subject matters, in part, by enabling users to interact with the application in a variety of ways. For instance, some user may desire an entirely passive experience, and can therefore simply browse for, and read, questions and answers on topics of interest. Some users may desire an experience including a moderate level of participation, and as such, these users can vote up or down various answers on topics of interest, and possibly provide commentary. Others may desire to participate more actively, and will elect to post questions and answers to questions.

Figure 2:
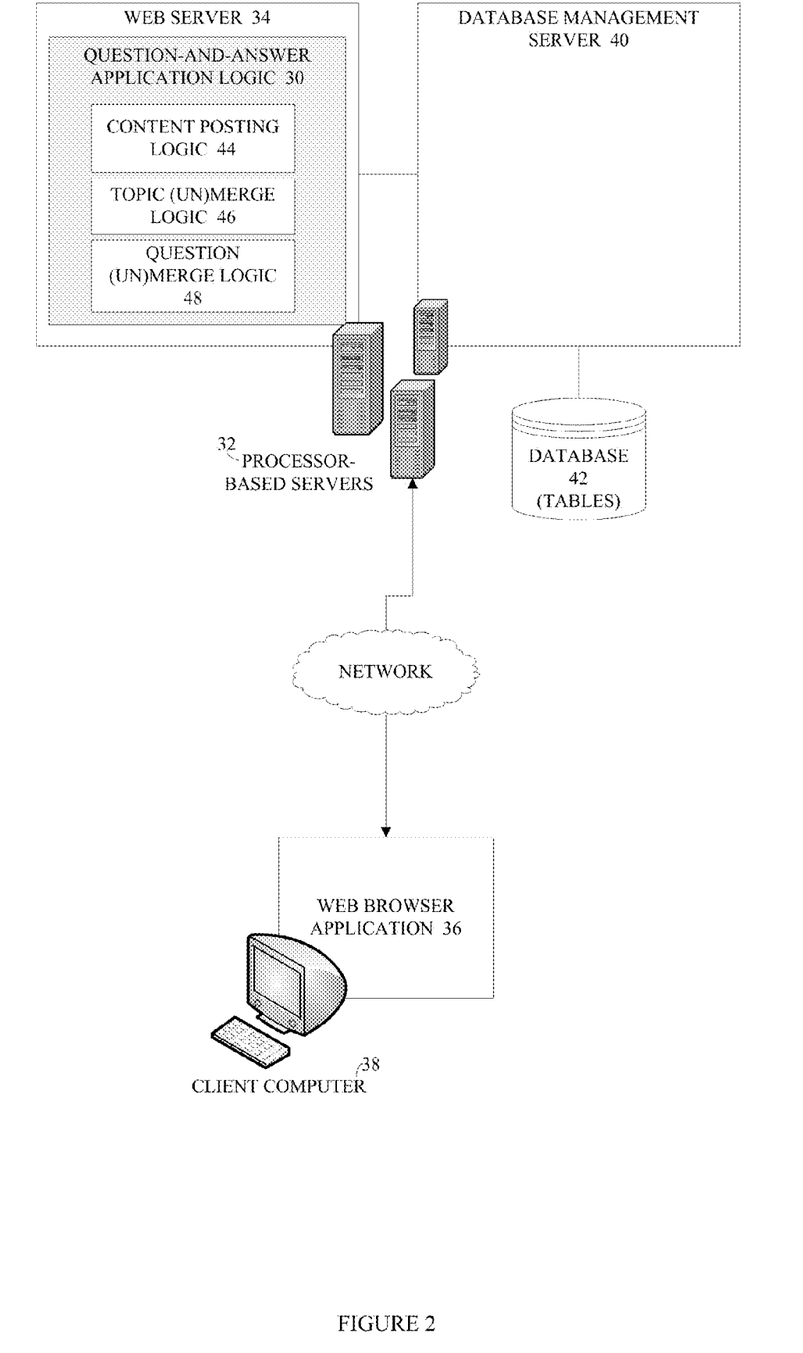
FIG. 2 is a system-level block diagram illustrating some of the system components and functional modules used in implementing a question-and-answer application consistent with an embodiment of the invention.

FIG. 2 is a system-level block diagram illustrating some of the system components and functional modules used in implementing a question-and-answer application consistent with an embodiment of the invention. As illustrated in FIG. 2, in some embodiments, a question-and-answer application is implemented as a web-based application having application logic 30 residing at one or more processor-based computer servers 32. At least some of the servers 32 include a web server 34 component for serving data (e.g., documents) to a conventional web browser application 36 residing and executing at a client computer 38.

As illustrated in FIG. 2, a client computer 38 executes a web browser application 36 to access the web-based question-and-answer application. In various alternative embodiments, the client computer 38 may be a mobile computing device, to include, a laptop, mobile phone or tablet computer. As such, in some embodiments, the application may have an interface that is customized for display in a browser of a mobile device. However, in some embodiments, the client-based application may not be browser-based, but instead may be customized to suit the particular operating system of the device on which it is executing. For instance, a customized application may utilize one or more application programming interfaces that are unique to the particular device and operating system on which the customized application resides and executes.

The question-and-answer application logic 30 is shown in FIG. 2 to include content posting logic 44, topic merge (and unmerge) logic 46, and question merge (and unmerge) logic 48. The content posting logic 44 enables users to post questions, answers and comments. The topic merge (and unmerge) logic 46 facilitates the merging of topics, while the question merge logic 48 facilitates the merging of questions. Of course, the application logic 40 may include a number of other logical components to perform a variety of other tasks and functions beyond the immediate scope of the present inventive subject matter. As such, to avoid obscuring the inventive subject matter in unnecessary detail, these various functional components are not shown in FIG. 2.

In some embodiments, some of the various functional components of the question-and-answer application, including some of the various software modules, may be distributed across several server computers, providing application reliability and scalability. For instance, as illustrated in FIG. 2, the database management server 40 is shown to reside on a separate server computer. However, in other embodiments the database management server 40 might reside and execute at the same server as the application logic 32 and web server 34. In any case, the database management server 40 facilitates the writing and reading of data stored in tables of a database 42, some of which are described in connection with the description of FIG. 3. In some alternative embodiments, other data structures may be utilized in addition to, or in place of, database tables.

Figure 3:
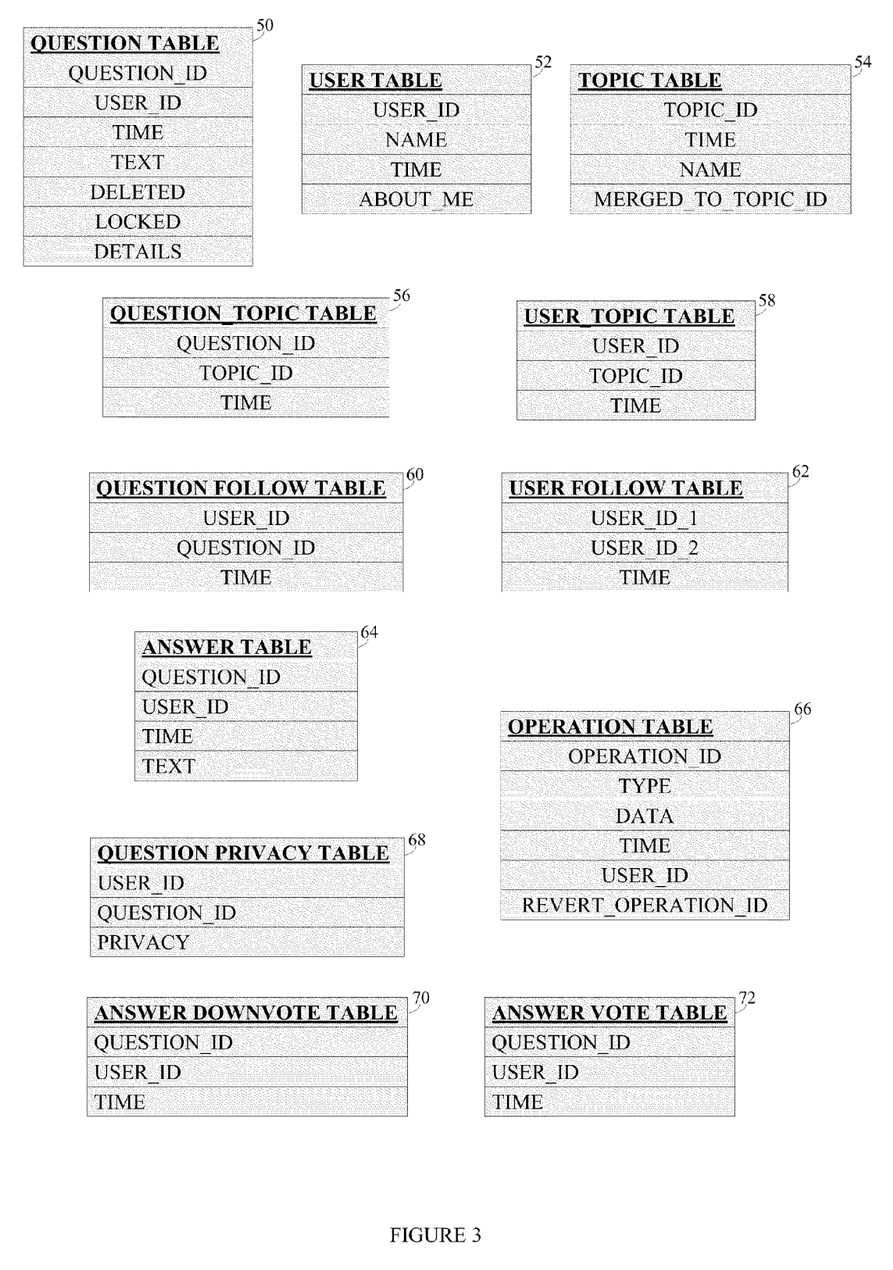
FIG. 3 shows some example data structures—in the form of database tables—for use in implementing a question-and-answer application consistent with an embodiment of the invention.

FIG. 3 shows some example data structures—in the form of database tables—for use in implementing a question-and-answer application consistent with an embodiment of the invention. The database tables shown in FIG. 3 are provided as an example of one particular embodiment of the invention, and are not meant to limit the invention to any particular implementation. Accordingly, the exact arrangement of database tables shown in FIG. 3, including the naming conventions for tables and columns, are provided as examples and are meant to convey an understanding of the inventive subject matter, and one particular context in which the inventive subject matter might be implemented, without limiting the invention. Moreover, it will be readily appreciated by skilled artisans that various other tables (not shown in FIG. 3) might be utilized to implement various aspects of a question-and-answer application that is consistent with embodiments of the inventive subject matter described herein.

As illustrated in FIG. 3, three primary tables are shown along with a variety of other tables used in implementing a question-and-answer application, consistent with embodiments of the invention. The three primary tables include the QUESTION table 50, the USER table 52 and the TOPIC table 54. The QUESTION table 50 includes fields for storing various information about questions, including a QUESTION_ID field for storing a question identifier to uniquely identify a question, a USER field to store a user identifier uniquely identifying the particular user who posted the question, a TIME field to store a time indicating when the question was posted, a TEXT field to store the exact text of the question, and various other fields for storing certain attributes of a question. The USER table 52 includes a USER_ID field for storing an user identifier for each user of the application, a NAME field for storing the actual name of a user, a TIME field for storing the date and/or time when the user became a member of the site, and an ABOUT_ME field for storing a brief description of the user. The TOPIC table includes a TOPIC_ID field for storing a topic identifier that uniquely identifies a topic, a TIME field that indicates when the topic was generated, a NAME field for storing the actual name of the topic, and a MERGED_TO_TOPIC_ID field that stores a topic identifier of another topic into which a topic has been merged.

A variety of other supporting tables are also shown in FIG. 3, to include a QUESTION_TOPIC table 56 that maps questions to topics, a USER_TOPIC table 58 that maps users to topics, a QUESTION_FOLLOW table 60 that identifies the particular topics that each user is following, and a USER_FOLLOW table 62 that identifies the particular users that each user is following. In addition, FIG. 3 includes an ANSWER table 64 that includes fields for storing various attributes of an answer to a question, including the question identifier of the particular question corresponding with the answer, the actual text of the answer, the user identifier of the user who posted the answer, and the time at which the answer was posted.

An OPERATION table 66 includes various fields for storing information that handles various version control features. For example, the OPERATION table 66 has an OPERATION_ID field for storing an operation identifier, a TYPE field for storing an operation type, a DATA field for storing data relevant to a particular operation, a TIME field to indicate the time the operation was successfully completed, a USER_ID field to store the user identifier of the user who initiated the operation, and a REVERT_OPERATION_ID to store an operation identifier for an operation that was completed to revert a previous operation. Using this information, various operations having different operation types can be reverted, such that the operation is effectively undone. For example, one particular operation type involves merging one topic into another topic. When a topic merge operation is successfully completed, a record will be generated in the OPERATION table 66. If it becomes necessary to undo the topic merge operation, the relevant data in the record can be utilized to simply undo the topic merge operation.

In some embodiments, a user can participate anonymously. Accordingly, the QUESTION_PRIVACY table 68 stores information to indicate whether a user's identification information (e.g., name) should be displayed in connection with a particular question.

As briefly described above, in some embodiments users can vote up or vote down answers to questions. Accordingly, the ANSWER_DOWNVOTE table 70 and the ANSWER_VOTE table 72 include fields for storing voting information for different questions, to include the user identifier of the user who voted up or down a particular answer. Such information can be used in various algorithms designed to determine how best to present answers to users.

Figure 4:
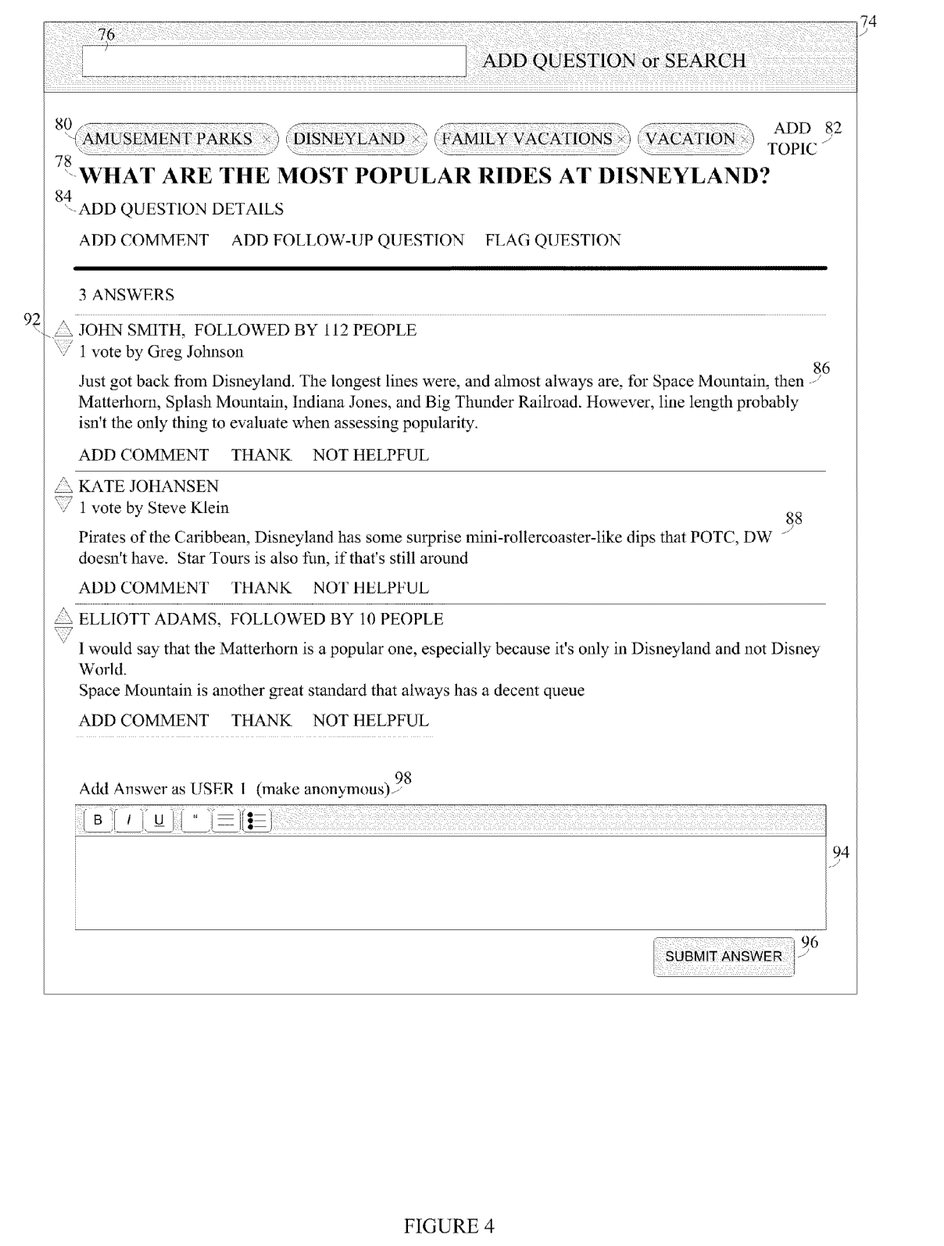
FIG. 4 is a user interface diagram illustrating an example of a user interface for use with a question-and-answer application consistent with an embodiment of the invention.

FIG. 4 is a user interface diagram illustrating an example of a user interface for use with a question-and-answer application consistent with an embodiment of the invention. As with the various tables illustrated in FIG. 3, the example user interface shown in FIG. 4 is provided to convey an understanding of the inventive concepts described herein, and a particular context in which the inventive subject matter might be implemented. It will be readily appreciated by those skilled in the art that the example user interface is but one example of a user interface.

As illustrated in FIG. 4, a header or banner section 74 is shown to include a text input box 76 where a user can enter a question, or alternatively, enter one or more keywords to be used in a search for a question. Under the header section 74 is a portion of the user interface showing a question 78, and several topics 80 to which the question is currently assigned. For instance, in this example, the question is: "What are the most popular rides at Disneyland?" The topics 80 to which the question has been assigned include: "Amusement Parks," "Disneyland," "Family Vacations," and "Vacation." Next to the topics is a link (or, button) 82 enabling a user to add a new topic to be associated with question. In addition, a separate button or link 84, shown in FIG. 4 with text "Add Question Details" provides the user with the ability to enter additional details about the question. Separate buttons or links exist for other user functionality, such as adding comments about the question, adding a follow-up question and flagging the question, for example, as being inappropriate.

In this example user interface, beneath the question 78 are three answers 86, 88 and 90 provided by three different users. Associated with each question is a name of the user who posted the answer, along with an indication of the number of people following that user. For example, the first answer 86 was posted by the user, John Smith, while the second answer 88 was posted by Kate Johansen, and the third answer 90 by Elliott Adams. Beneath each respective answer are buttons or links that enable a user to add a comment about an answer, or indicate that an answer was helpful or not helpful. In addition, to the left of each answer are two arrows for use in voting. For example, the arrow buttons (up and down) for the answer posted by John Smith have reference number 92.

At the bottom of the example user interface in FIG. 4, there is a text box 94 providing a user with the ability to submit a new answer to the question 78. For example, a user can type an answer in the text box 94 and then hit the SUBMIT ANSWER 96 button to post the answer to the question-and-answer application. To make an answer anonymous, such that the posting user's name will not be displayed next to the answer, an anonymous button or link 98 is provided.

Figure 5:
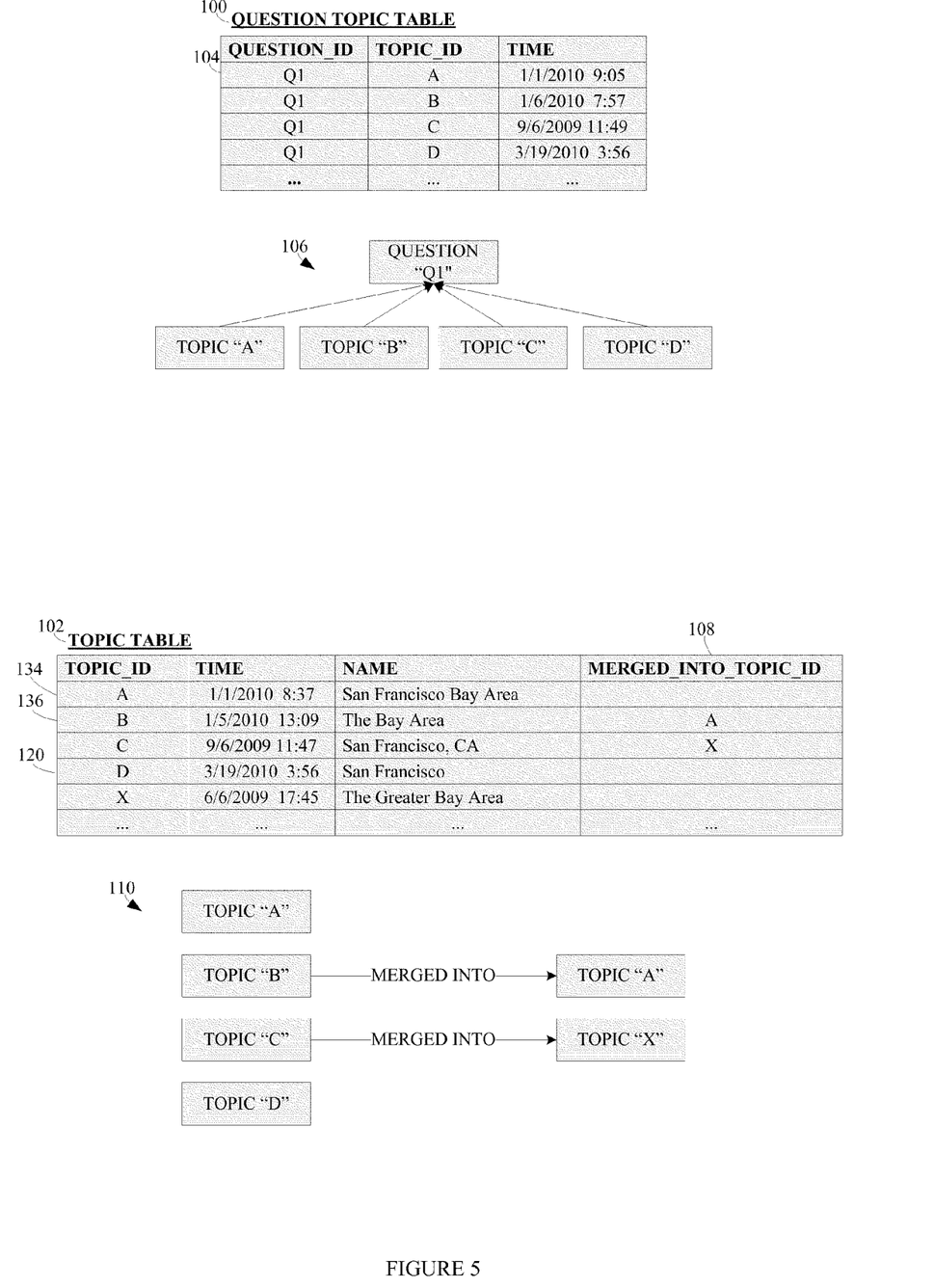
FIG. 5 is a block diagram showing an example of how database tables can be utilized in a topic merge operation to merge two topics with one another, consistent with an embodiment of the invention.
Figure 6:
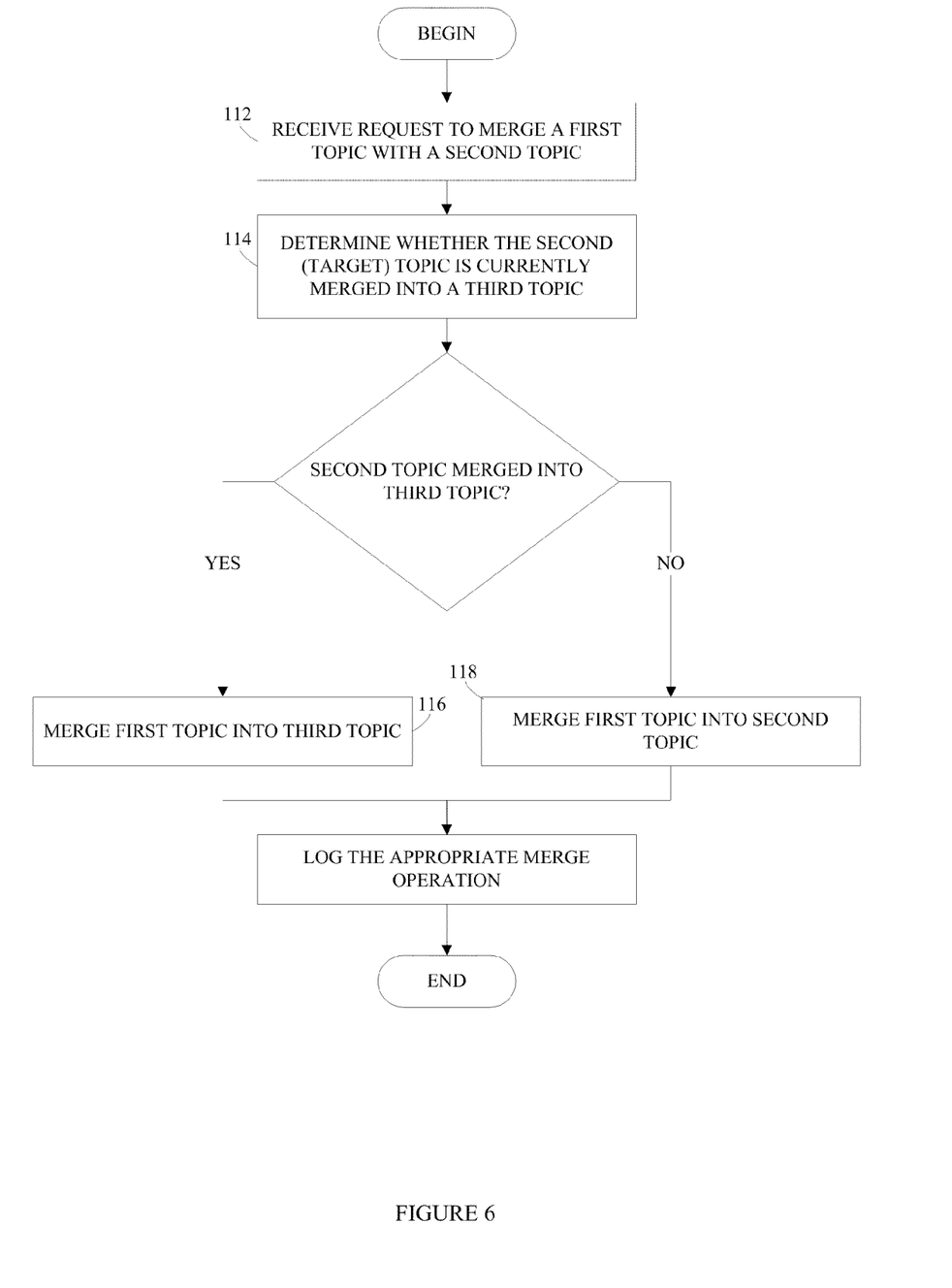
FIG. 6 is a flow diagram illustrating method operations involved in a method to merge one topic with another, consistent with an embodiment of the invention.

FIG. 5 is a block diagram showing an example of how database tables can be utilized in a topic merge operation to merge two topics with one another, consistent with an embodiment of the invention. More specifically, the examples presented in FIGS. 5 and 6 show how a first topic can be merged into a second (target) topic. In FIG. 5, two separate tables are shown—a QUESTION TOPIC table 100 and a TOPIC table 102. The QUESTION TOPIC table 100 maps a question to a particular topic, and as such, has three columns—a QUESTION_ID column, a TOPIC_ID column, and a TIME column. Accordingly, each record in the QUESTION TOPIC table consists of a question identifier that uniquely identifies a question, a topic identifier to identify a topic to which the question with the corresponding QUESTION_ID is associated, and a time at which the question was assigned to, or associated with, the corresponding topic. For instance, the record with reference number 104 indicates that the question with question identifier, "Q1", is associated with the topic having topic identifier, "A", and that the association was made on Jan. 1, 2010 at 9:05.

The relationship diagram 106 provides a visual representation of the relationships between the question with question identifier, "Q1", and various topics, as set forth by the data shown in the example QUESTION TOPIC table 100 of FIG. 5. In particular, the relationship diagram 106 shows that the topics with topic identifiers "A", "B", "C" and "D" are all assigned to, or associated with, the question with question identifier "Q1".

The TOPIC table 102 maps topics to their respective topic names. In addition, when a topic has been merged into another topic, this relationship is reflected in the TOPIC table 102. For instance, the TOPIC table maps a topic identifier (e.g., "A") to an actual topic name (e.g., "San Francisco Bay Area"), and indicates whether the topic has been merged into another topic. As shown in FIG. 5, the TOPIC table includes four columns, including a TOPIC_ID column, a TIME column, a NAME column, and a MERGED_INTO_TOPIC_ID column. A topic identifier, if present in the MERGED_INTO_TOPIC_ID field 108, indicates the particular topic into which a topic has been merged. As such, a record in the TOPIC table 102 indicates a topic identifier for identifying a topic, the time at which the topic was first generated, the actual name of the topic, and a field—the MERGED_INTO_TOPIC_ID field 108—to indicate whether the topic has been merged into another target topic, and the topic identifier of that target topic.

The relationship diagram 110 associated with the TOPIC table 102 provides a visual representation of the relationships set forth by the data in the TOPIC table 102. Specifically, from the relationship diagram 110, it is easy to see that the topic, "The Bay Area," with topic identifier, "B", has been merged into the topic, "The Greater Bay Area," with topic identifier, "A". Similarly, the topic with topic identifier "C" has been merged into the topic with topic identifier "X". The topics that correspond with topic identifiers "A" and "D" respectively have not been merged into other topics.

As will be described in greater detail below, when a user requests that a particular topic be merged with another topic, the topic merge logic 46 processes the request by simply writing the topic identifier of the target topic in the MERGED_INTO_TOPIC_ID field 108 of the particular topic that is being merged. For instance, to merge the topic, "San Francisco," with topic identifier "D" into the topic, "San Francisco Bay Area," with topic identifier "A", the topic merge logic 46 would simply write the topic identifier for the topic, "San Francisco Bay Area" (i.e., TOPIC_ID="A") in the MERGED_INTO_TOPIC_ID field of the relevant record for the topic, "San Francisco".

FIG. 6 is a flow diagram illustrating method operations involved in a method to merge one topic with another, consistent with an embodiment of the invention. At method operation 112, a request is received to merge a first topic with a second (target) topic. Specifically, the request indicates that a first topic should be merged into the second (target) topic. As such, at a minimum, the request identifies a first topic and a second target topic into which the first topic is to be merged. The request may be received (e.g., by the topic merge logic 46) as a result of a user or administrator, manipulating one or more elements of a graphical user interface. For instance, a user may select a button to edit or manage a first particular topic, and in response, the user may be presented with a web page having another button that initiates a topic merge operation. When this second button is selected, the user may be presented with a list of topics from which to select the target topic into which the first particular topic is to be merged. The request to merge the two topics is thus generated as a result of a user or administrator manipulating one or more graphical user interface elements and identifying a first topic that is to be merged, and a target topic into which the first topic is to be merged.

At method operation 114, the question-and-answer application determines whether the target topic is currently merged with another topic. For instance, the topic merge logic 46 may simply perform a database look-up operation to determine whether the MERGED_INTO_TOPIC_ID field for the target topic is populated with a topic identifier of another topic. If the MERGED_INTO_TOPIC_ID field for the target topic is storing a valid topic identifier for another topic, indicating that the target topic is itself merged into another topic, then at method operation 116, the topic merge logic 46 merges the first topic into the same topic with which the target topic is merged. Specifically, the first topic will be merged with the topic identified by the topic identifier in the MERGED_INTO_TOPIC_ID field of the target topic.

Referring again to the example TOPIC table 102 illustrated in FIG. 5, if a request is received to merge the topic, "San Francisco," with topic identifier "D" into the topic, "San Francisco, Calif.," with topic identifier "C", the result will be that the topic, "San Francisco," will not be merged with the topic, "San Francisco, Calif.", but will instead be merged into the topic, "The Greater Bay Area" with topic identifier, "X". This topic merge operation will be achieved by simply writing the topic identifier, "X" into the MERGED_INTO_TOPIC_ID field 108 of the record for topic, "San Francisco" with topic identifier, "D".

However, if at method operation 114, it is determined that the target topic is not merged into another topic, then at method operation 118, the first topic is merged into the second (target) topic by simply writing the appropriate topic identifier into the appropriate field, which in this example is the MERGED_INTO_TOPIC_ID field. Referring again to the example TOPIC table 102 in FIG. 5, if a request indicates that the topic "San Francisco" with topic identifier, "D," is to be merged with the topic, "San Francisco Bay Area," with topic identifier, "A," then the topic identifier, "A" is written in the MERGED_INTO_TOPIC_ID field 108 of the record with reference number 120 to indicate that the topic "San Francisco" is merged into the topic "San Francisco Bay Area." After the appropriate record in the TOPIC table 102 has been updated, the topic merge operation is logged in the appropriate logging table or tables to reflect the successful completion of the topic merge operation.

Figure 7:
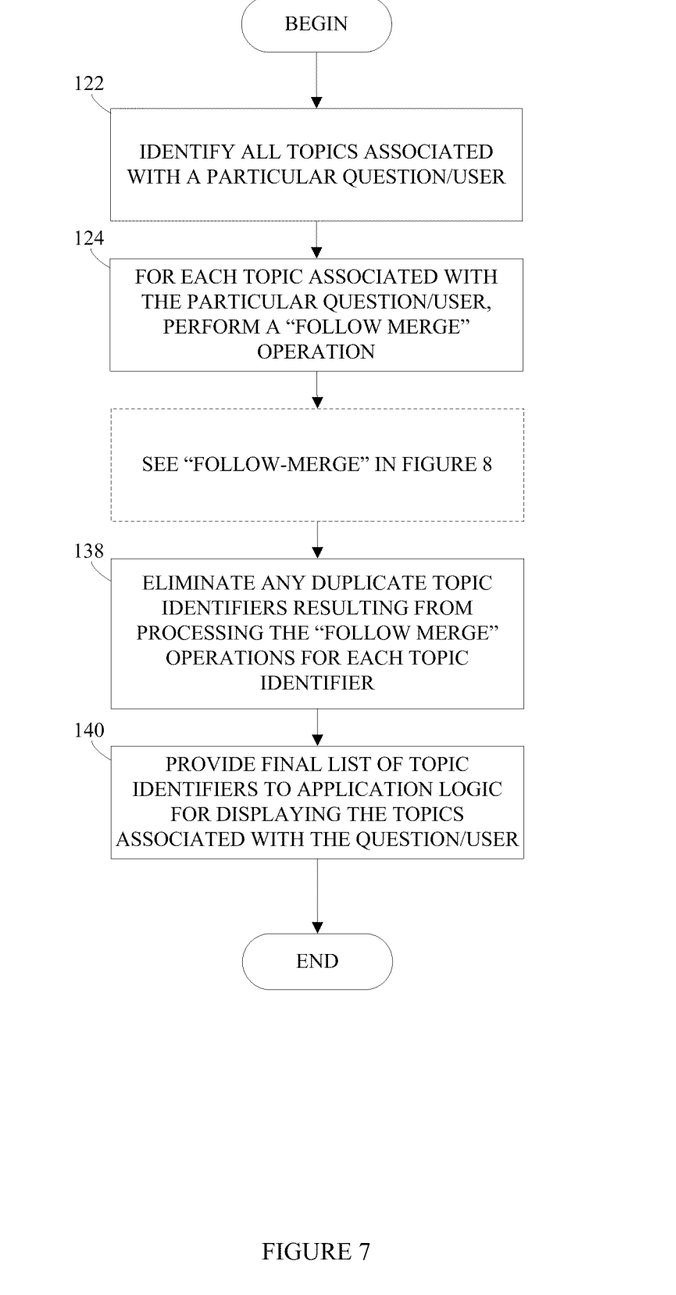
FIG. 7 is a flow diagram illustrating method operations involved in a method to identify and display topics associated with a content item, such as a question or answer in a question-and-answer application, according to an embodiment of the invention.

FIG. 7 is a flow diagram illustrating method operations involved in a method to identify and display topics associated with a content item, such as a question or answer in a question-and-answer application, according to an embodiment of the invention. The method illustrated in FIG. 7 may be performed, for example, when a question-and-answer application is generating a web page to present to a particular user, such that the web page shows all of the topics associated with a particular question, or, all of the topics that the particular user is following. As such, the method may be performed in response to a user requesting, via a client application (e.g., web browser) a web page that is to include the relevant topics for a question or user.

The method begins at method operation 122 when all of the topics associated with a particular question (or user), as indicated in a first database table, are identified. For example, if all of the topics associated with a particular question are to be displayed, the QUESTION TOPIC table 100 (FIGS. 3 and 5) may be analyzed to identify all of the topic identifiers that are associated with the question identifier of the particular question. By way of example, referring to the QUESTION_TOPIC table 100 of FIG. 5, the completion of method operation 122 for the question with question identifier, "Q1", would result in a list of topic identifiers including, topic "A", topic "B", topic "C", and topic "D". Similarly, if all of the topics a particular user is following are to be presented, the USER TOPIC Table 58 (FIG. 3) may be analyzed to identify all of the topic identifiers associated with the user identifier of the particular user.

In both cases, the list of topics, or topic identifiers to be more precise, resulting from method operation 122 may not be the final list of topics as the initial list will not reflect the fact that one or more topics may have been merged into another topic. As such, at method operation 124, for each topic that was identified in method operation 122, a "follow-merge" operation is performed. A follow-merge operation may be performed by follow-merge logic that is implemented as a function or sub-routine that is part of the topic merge logic 46, or as a standalone function or subroutine that is called by the topic merge logic 46. In either case, the follow-merge logic receives as input a particular topic identifier, and returns either the topic identifier of another topic—indicating the topic corresponding to the input topic identifier has been merged into another topic—or, the same topic identifier that was received as input, indicating that the topic associated with the received input topic identifier has not been merged into another topic. An example method of a "follow-merge" operation is shown in FIG. 8.

Figure 8:
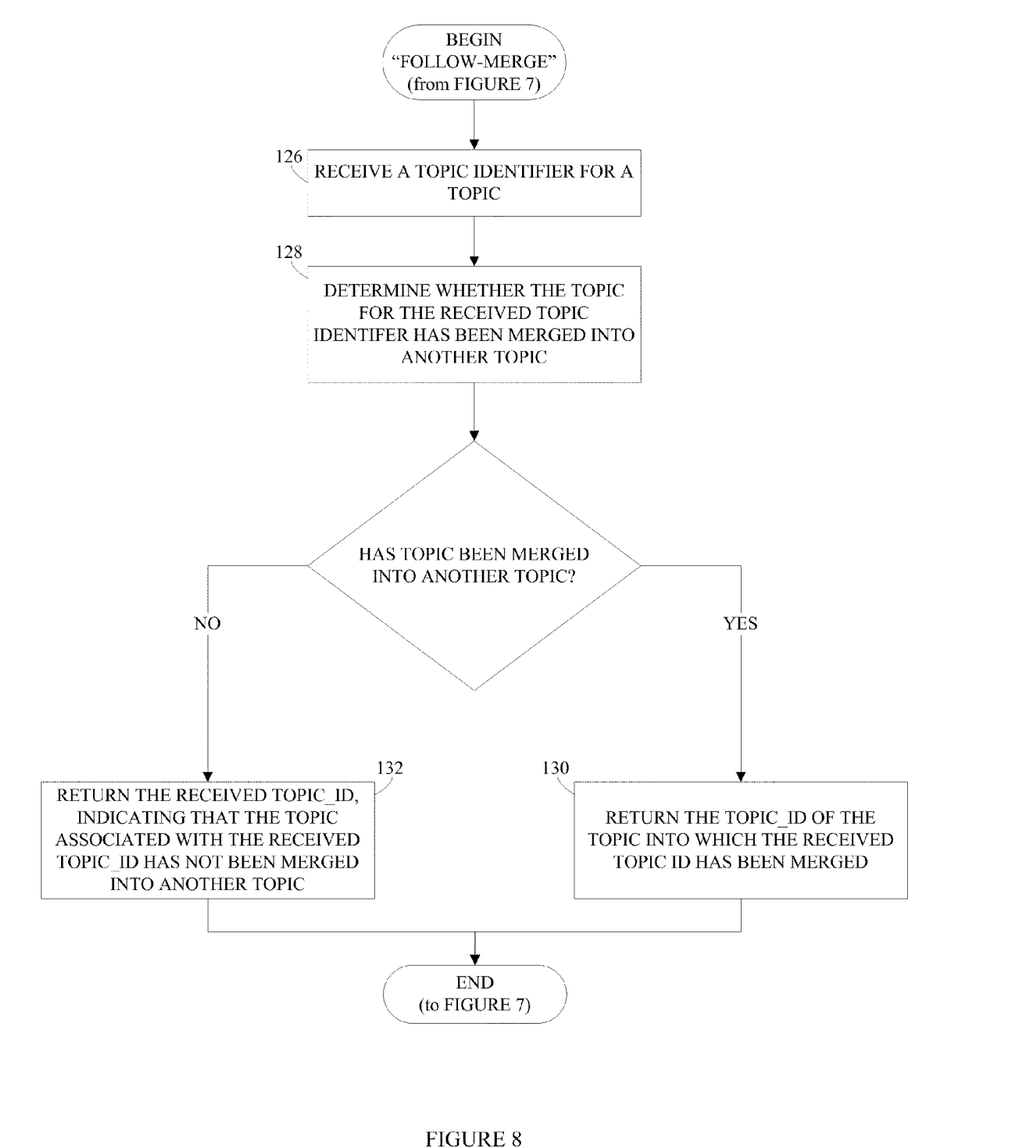
FIG. 8 is a flow diagram illustrating method operations involved in method for performing a "follow-merge" operation for use in identifying topics that have been merged into other topics, according to an embodiment of the invention.

Referring to FIG. 8, at method operation 126, a topic identifier is received (e.g., by the follow-merge logic) for a particular topic. At method operation 128, the follow-merge logic determines whether the topic associated with the received topic identifier has been merged into another topic. For example, this may involve reading or otherwise analyzing the MERGED_INTO_TOPIC_ID field of the record in the TOPIC table 102 corresponding to the input topic identifier. If the MERGED_INTO_TOPIC_ID field contains a valid topic identifier, this indicates that the topic corresponding to the received topic identifier has previously been merged into another topic. Accordingly, at method operation 130, the follow-merge logic returns the topic identifier of the topic into which the received topic (topic identifier) has been merged. However, if the MERGED_INTO_TOPIC_ID field does not contain a topic identifier, then it is presumed that the topic corresponding with the received topic identifier has not previously been merged into another topic. Referring briefly to the TOPIC table 102 in FIG. 5, if the follow-merge operation is invoked for the topic, "San Francisco Bay Area" with topic identifier "A" (e.g., the record with reference number 134), the follow-merge operation would return topic identifier, "A" indicating that the topic, "San Francisco Bay Area" has not previously been merged with another topic. On the other hand, if the follow-merge operation is invoked for the topic, "The Bay Area" with topic identifier "B" (e.g., the record with reference number 136), the follow-merge operation would return topic identifier, "X" indicating that the topic, "The Bay Area" has previously been merged with the topic, "The Greater Bay Area" with topic identifier, "X".

Returning now to the method illustrated in FIG. 7, once the follow-merge operation has been performed for each topic identifier that was determined to be associated with the question (or, user), at method operation 138, all duplicate topic identifiers are eliminated. For example, because some topics may have been merged into others, the list of topic identifiers generated by the follow-merge operation may include duplicates. Accordingly, the duplicate topic identifiers are identified and removed from the resulting list of topic identifiers. By way of example, referring again to the TOPIC table 102 in FIG. 5, the list of topic identifiers resulting from method operation 124 would include topic identifiers, "A", "A", "X", and "D". After removing duplicates, the final list would include topic identifiers, "A", "X", and "D".

Finally, at method operation 140, the list of topic identifiers resulting from method operation 138 are provided to the appropriate application logic for processing and display to a user. For example, the list of topic identifiers may be used to query one or more other database tables for related information, which is then collectively used in the generation of a web page that is served to a client application, such as a web browser application, of a user.

Figure 9:
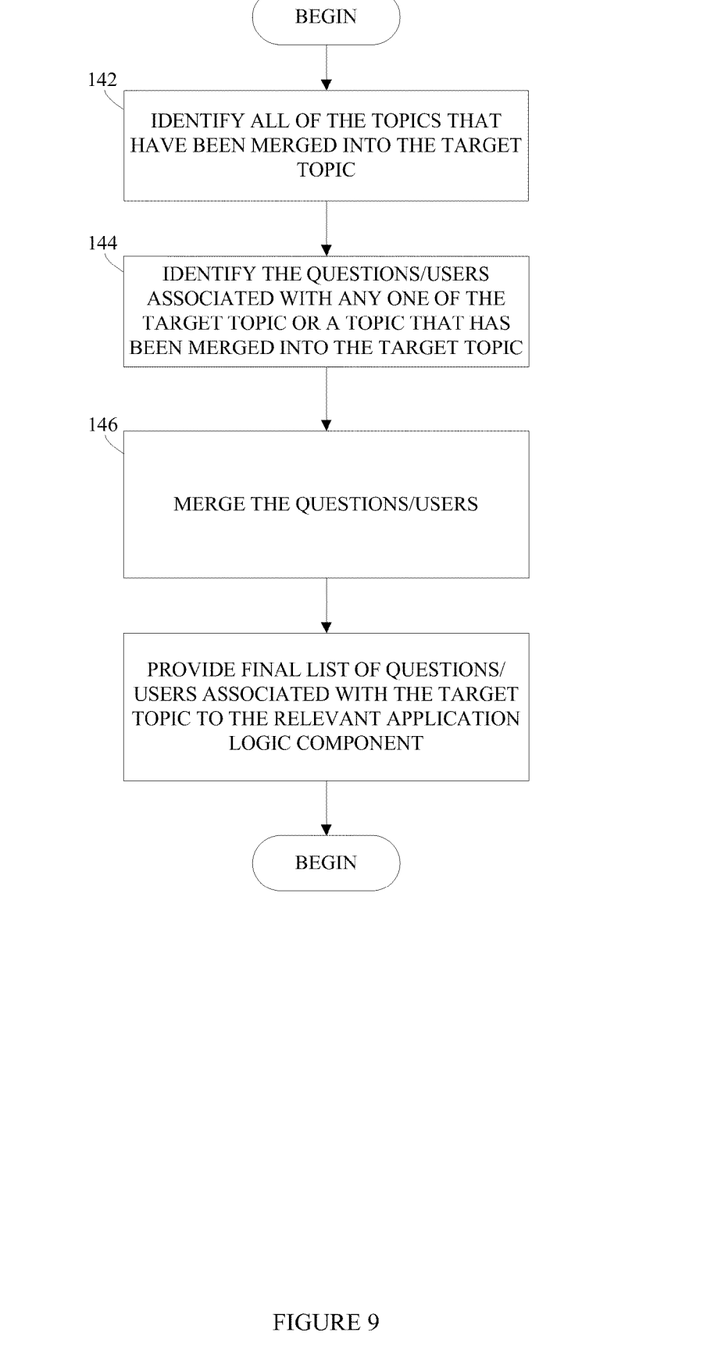
FIG. 9 is a flow diagram illustrating method operations involved in a method to identify content items (e.g., questions or users) to which a particular topic is associated.

FIG. 9 is a flow diagram illustrating method operations involved in a method to identify content items (e.g., questions or users) to which a particular topic is associated. This method might be performed, for example, when a user requests to see all of the questions associated with a particular topic, or, all of the users following a particular topic. The method begins at operation 142 when a request for all questions (or, users) associated with a particular topic is received, and in response, all topics that have been merged into the particular topic are identified. For example, to identify the relevant topics, the topic identifier for the requested topic must first be identified, and then all topics having the topic identifier of the requested topic in the MERGED_INTO_TOPIC_ID field (column 108 in FIG. 5), indicating that the particular corresponding topic has been merged with the requested topic. Referring to the TOPIC table 102 in FIG. 5, if the request is for all questions associated with the topic, "San Francisco Bay Area," with topic identifier "A", then the TOPIC table 102 is read to identify the topic identifier for the topic, "San Francisco Bay Area"—in this case, topic identifier, "A". Next, any records that have the topic identifier, "A" in the MERGED_INTO_TOPIC_ID field 108 are identified. In this example, the record with reference number 136 indicates that the topic, "The Bay Area" with topic identifier, "B" has been merged into the topic "San Francisco Bay Area," with topic identifier "A".

After the relevant topic identifiers have been identified—including the topic identifier for the requested topic and the topic identifiers for any topics that have been merged into the requested topic—at method operation 144, the questions (or, users) associated with the relevant topic identifiers are identified. For example, using the relevant topic identifiers, the appropriate table can be queried to identify the questions (or, users) that are associated with the various topic identifiers. Referring to FIG. 3, the QUESTION TOPIC table 56 might be queried to identify the questions related to the various topic identifiers. Similarly, the USER TOPIC table 58 might be queried if the initial request is for all users associated with a particular topic.

Next, at method operation 146, the questions (or, users) determined to be related to the various topic identifiers identified at method operation 142 are merged. Finally, at method operation 148, the merged list of questions (or, users) is provided to the relevant application logic component for further processing and display to a user.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules or logical components referred to herein may, in some example embodiments, comprise processor-implemented modules or logic.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 10:
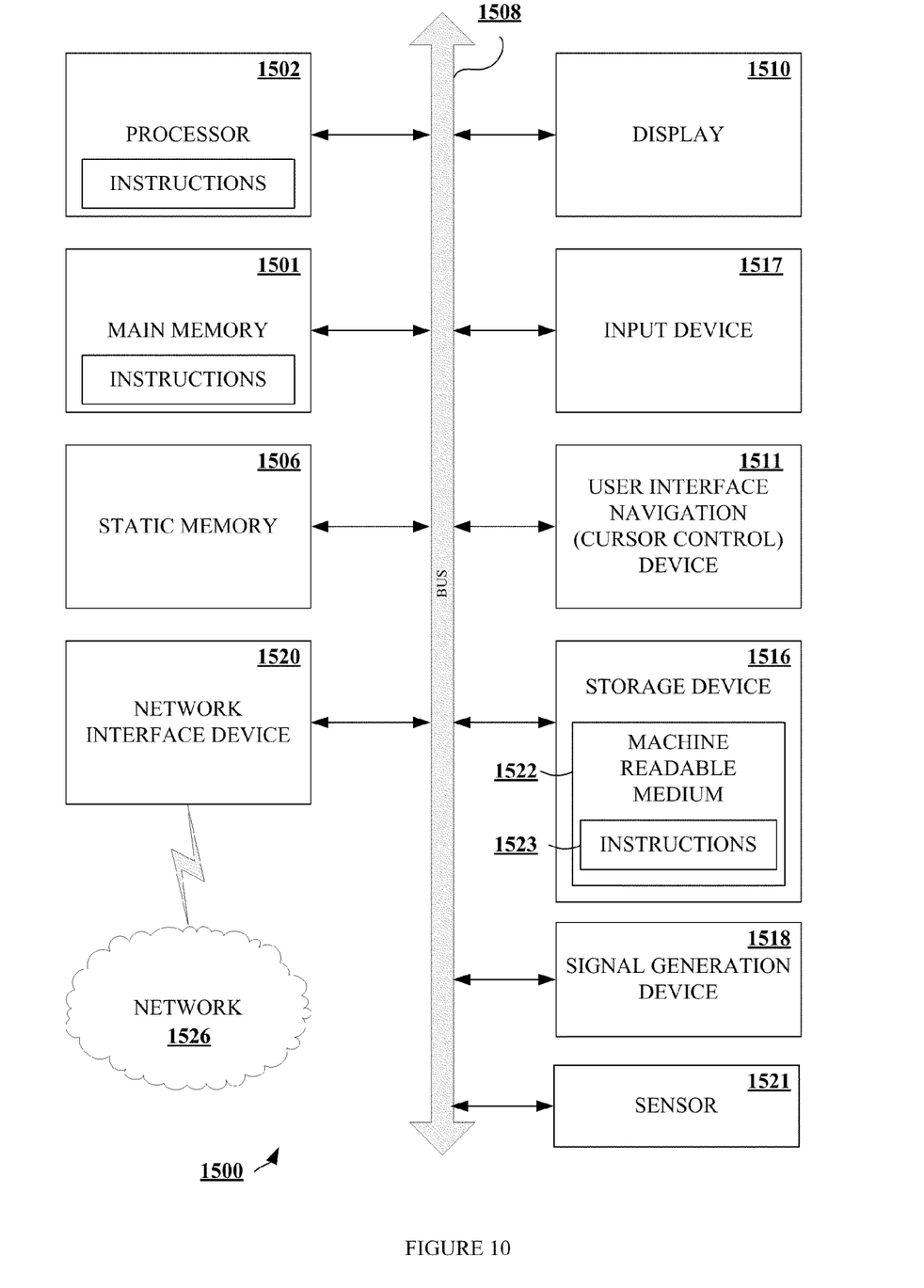
FIG. 10 is a block diagram of a machine in the form of a computer within which a set of instructions, for causing the machine to perform any one or more of the methodologies discussed herein, may be executed.

FIG. 10 is a block diagram of a machine in the form of a computer within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method to merge topics associated with a content item of an online application, the method comprising:
receiving a request to merge a first topic with a second topic, the first and second topics stored as separate records in a database table, each record having a first field to store a topic identifier that identifies its respective topic and a second field to store a topic identifier into which the respective topic has been merged; and
responsive to reading the second field of the record for the second topic to determine that the second topic has not been merged with another topic, using processor-implemented topic merge logic to write the topic identifier of the second topic into the second field of the record for the first topic to indicate that the first topic has been merged into the second topic, wherein removal of the topic identifier from the second field of the record of the first topic undoes the merge.

2. The computer-implemented method of claim 1, further comprising:
upon successfully writing the topic identifier of the second topic into the second field of the record for the first topic to indicate that the first topic has been merged into the second topic, updating a database table with operation logging information that allows the merge to be undone.

3. The computer-implemented method of claim 1, wherein the content item is a question of a question-and-answer application and the first and second topics are associated with one or more questions of the question-and-answer application and designate a subject matter related to the one or more questions.

4. A processing system comprising:
   at least one processor; and
   a machine-readable medium in communication with the at least one processor, the machine readable medium storing application logic including topic merge logic that is executable by the at least one processor, the application logic being executed by the at least one processor to cause operations to be performed, the operations comprising:
      receiving a request to merge a first topic with a second topic, the first and second topics stored as separate records in a database table, each record having a first field to store a topic identifier that identifies its respective topic and a second field to store a topic identifier into which the respective topic has been merged; and
      responsive to reading the second field of the record for the second topic to determine that the second topic has not been merged with another topic, writing the topic identifier of the second topic into the second field of the record for the first topic to indicate that the first topic has been merged into the second topic, wherein removal of the topic identifier from the second field of the record of the first topic undoes the merge.

5. The processing system of claim 4, wherein the operations further comprise:
   upon successfully writing the topic identifier of the second topic into the second field of the record for the first topic to indicate that the first topic has been merged into the second topic, updating a database table with operation logging information that allows the merge to be undone.

6. The processing system of claim 4, wherein the topic merge logic is to prevent the first topic from being merged into the second topic when the second field of the record for the second topic contains a topic identifier of a third topic, indicating that the second topic has been merged into the third topic.

7. A computer-implemented method to merge topics associated with a content item of an online application, the method comprising:
   receiving a request to merge a first topic with a second topic, the first and second topics stored as separate records in a database table, each record having a first field to store a topic identifier that identifies its respective topic and a second field to store a topic identifier into which the respective topic has been merged; and
   responsive to reading the second field of the record for the second topic to determine that the second topic has been merged with a third topic, using processor-implemented topic merge logic to write a topic identifier of the third topic into the second field of the record for the first topic to indicate that the first topic has been merged into the third topic, wherein removal of the topic identifier from the second field of the record of the first topic undoes the merge.

8. The computer-implemented method of claim 7, further comprising:
   upon successfully writing the topic identifier of the third topic into the second field of the record for the first topic to indicate that the first topic has been merged into the third topic, updating a database table with operation logging information that allows the merge to be undone.

9. The computer-implemented method of claim 7, wherein the content item is a question of a question-and-answer application, and the first, second and third topics are associated with one or more questions of the question-and-answer application and designate a subject matter related to the one or more questions.

10. A processing system comprising:
    at least one processor; and
    a machine-readable medium in communication with the at least one processor, the machine readable medium storing application logic including topic merge logic that is executable by the at least one processor, the application logic being executed by the at least one processor to cause operations to be performed, the operations comprising:
       receiving a request to merge a first topic with a second topic, the first and second topics stored as separate records in a database table, each record having a first field to store a topic identifier that identifies its respective topic and a second field to store a topic identifier into which the respective topic has been merged;
       responsive to reading the second field of the record for the second topic to determine that the second topic has been merged with a third topic, writing a topic identifier of the third topic into the second field of the record for the first topic to indicate that the first topic has been merged into the third topic, wherein removal of the topic identifier from the second field of the record of the first topic undoes the merge.

11. The processing system of claim 10, wherein the operations further comprise:
    upon successfully writing the topic identifier of the third topic into the second field of the record for the first topic to indicate that the first topic has been merged into the third topic, updating a database table with operation logging information that allows the merge to be undone.

12. The processing system of claim 10, wherein the topic merge logic is to prevent the first topic from being merged into the second topic when the second field of the record for the second topic contains a topic identifier of a third topic, indicating that the second topic has been merged into the third topic.

13. A computer-implemented method comprising:
    receiving at a question-and-answer application a request to display a content item with which one or more topics are associated;
    identifying a first set of topics by performing a first look-up operation with a first database table to identify topics associated with the content item as indicated in the first database table;
    identifying a second set of topics by performing a second look-up operation with a second database table, the second look-up operation to identify any topics into which a topic in the first set of topics has been merged based, at least in part, on a topic identifier of the first set of topics as included in the second database table, wherein removal of the topic identifier from the second database table undoes the merge;
    providing the second set of topics to application logic for further processing and presentation in a web page.

14. The computer-implemented method of claim 13, further comprising:
    removing any duplicate topics from the second set of topics prior to providing the second set of topics to the application logic.

15. The computer-implemented method of claim 13, wherein the request is for a question to which the topics are associated.

16. A processing system comprising:

at least one processor; and a machine-readable medium in communication with the at least one processor, the machine readable medium storing question-and-answer application logic that is executable by the at least one processor, the application logic being executed by the at least one processor to cause operations to be performed, the operations comprising:

receiving a request to display a content item with which one or more topics are associated;

identifying a first set of topics by performing a first look-up operation with a first database table to identify topics associated with the content item as indicated in the first database table;

identifying a second set of topics by performing a second look-up operation with a second database table, the second look-up operation to identify any topics into which a topic in the first set of topics has been merged based, at least in part, on a topic identifier of the first set of topics as included in the second database table, wherein removal of the topic identifier from the second database table undoes the merge; and     providing the second set of topics to application logic for further processing and presentation in a web page.

17. The processing system of claim 16, wherein the operations further comprise:

removing any duplicate topics from the second set of topics prior to providing the second set of topics to the application logic.

18. The processing system of claim 16, wherein the request is for a question to which the topics are associated.

\* \* \* \* \*